J. FISHWICK.
VELOCIPEDE.

No. 184,852. Patented Nov. 28, 1876.

WITNESSES:
W. W. Hollingworth
John C. Kenyon

INVENTOR:
Jas. Fishwick
BY
ATTORNEYS.

UNITED STATES PATENT OFFICE.

JAMES FISHWICK, OF CINCINNATI, OHIO.

IMPROVEMENT IN VELOCIPEDES.

Specification forming part of Letters Patent No. 184,852, dated November 28, 1876; application filed August 30, 1876.

*To all whom it may concern:*

Be it known that I, JAMES FISHWICK, of Cincinnati, in the county of Hamilton and State of Ohio, have invented a new and Improved Velocipede; and I do hereby declare that the following is a full, clear, and exact description of the same, reference being had to the accompanying drawing, forming part of this specification, in which—

Figure 1:
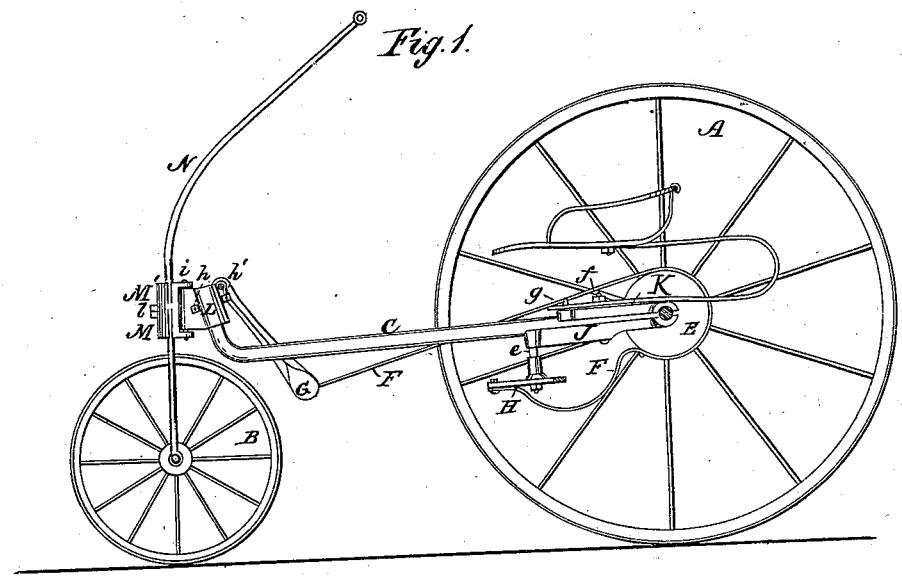
Figure 2:
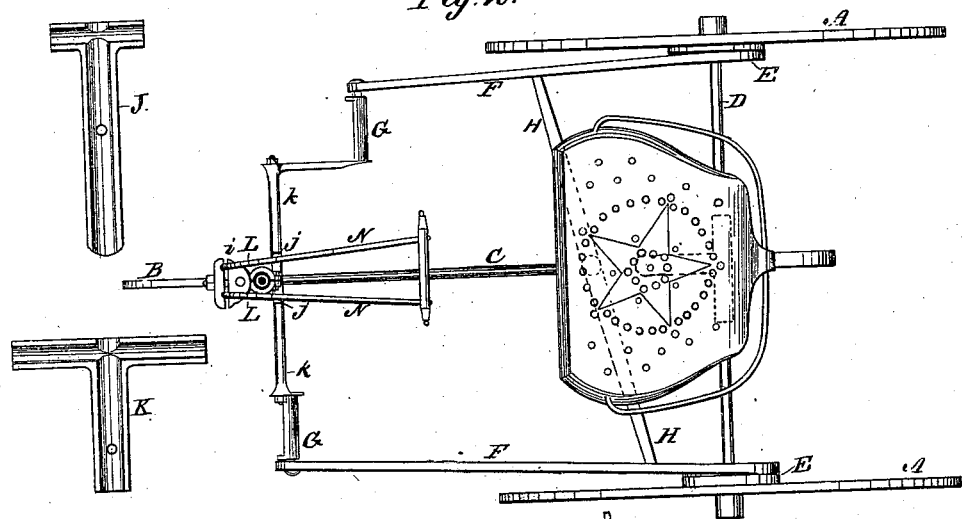
Figure 3:
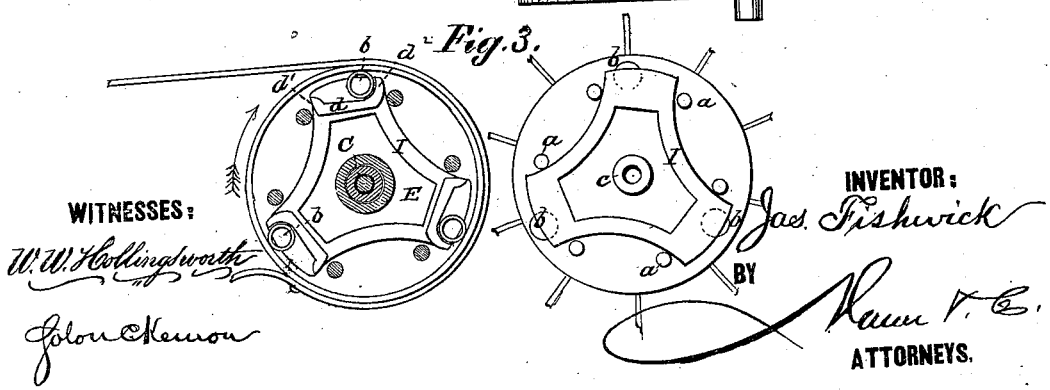

Figure 1 is a side elevation, partly in section; Fig. 2, a plan view. Fig. 3 are detail views of the clutch mechanism.

The object of my invention is to provide a simple, cheap, and substantial velocipede, more especially designed for the use of girls, but equally adapted for use by boys.

It consists in the driving mechanism, in the connection of the main axle to the reach, and in the connection of the front guide-wheel and lever to the reach, as hereinafter more fully described.

In the accompanying drawing, A represents the main wheels; B, the front guide-wheel, of smaller size; C, the reach, and D the main axle, in connection with which common and well-known parts my improvements are shown applied.

My driving mechanism consists of a specially devised contrivance, through which a pair of pulleys, E, are made to engage with and rotate the wheel when moved in one direction, and be independent of the same for the opposite direction. These pulleys are operated by straps or belts F, fastened to the same, one end of which straps are attached to the oscillating treadle-levers G, and the other ends of which are connected with the retracting-lever H. This retracting-lever is made to restore the advanced treadles to a position for a new impulse from the foot, for as the right treadle is advanced, the right-hand end of this lever is retracted, the left advanced, and consequently the left treadle retracted and placed in position for the pressure of the foot, after which the reverse movement takes place. The special devices through which I effect the alternate engagement of the wheel without the use of ratchets consist of the pulley E, before referred to, a triangular plate or frame, I, studs $a$, arranged upon a disk or plate of the wheel, and rollers $b$. The hub of the wheel is extended at $c$, and forms a bearing for the pulley E. This pulley is hollowed out and contains the triangular plate I. This plate contains three or more recesses, having inclined bottom $d$ and projecting lugs $d^1$ $d^2$. Between the plate and the inner periphery of the pulley are arranged the rollers $b$. Now, when the pulley is moved backward by the retracting-lever, the rollers occupy positions in the larger ends of the recesses by the lugs $d^2$, and revolve as in bearings, allowing the pulley to move freely and independently of the plate I, and of the wheel, with which plate I is coupled by the studs $a$; but when the pulley is moved in the opposite direction by the pressure upon the treadle, the rollers $b$ are urged toward the lug $d^1$, up the incline, and as they pass into a smaller portion of the recess they cause the pulley and plate I to bind rigidly together and compel the pressure of the treadles, through plate I and studs $a$, to be transmitted directly to the wheels, to urge them forward and impel the velocipede.

The object in extending the hub of the wheel at $c$, so as to form a bearing for the pulley, is to render the velocipede lighter-running, for if the plate I causes the pulley to bind, it would bind with a stationary surface, if it were pivoted directly upon the axle, and produce much friction and hard running, while, when pivoted upon the extension $c$ of the hub, this difficulty is obviated, for if the pulley binds, it binds with a surface attached to the wheel, and moving in the same direction, and is all the better for the binding, as it compels the wheel more readily to respond to the action of the treadles.

The connection of the reach to the main axle is designed for cheapness, compactness, and ready construction. It consists of two T-shaped plates, J K, hollowed out upon their shanks to fit and clasp the end of the reach, and hollowed out upon their transverse parts to fit and clasp the axle. The lower one of these plates, J, is provided with a stud, $e$, upon which the retracting-lever is pivoted. Through the two plates J K, the reach, and also through the spring that supports the seat, passes a single bolt, $f$, which bolt, when screwed up, serves to hold the reach to the axle, support the retracting-lever, and, with the assistance of a stud, $g$, on the upper plate K, fastens the spring that holds the seat in place.

The construction of the connection of the reach to the guide-wheel and lever is designed to secure also the same general results of cheapness, simplicity, and detachable construction. Two symmetrical plates, L L, are provided each with two semicircular depressions, and, when screwed up by the bolts $h\ h'$, one set of these depressions serves to clamp the upturned end of the reach, while the other clamps a pivot-bar, $i$, of the guide-wheel frame. The said plates L are also provided with the laterally-projecting studs $j\ j$, upon which the treadle-cranks are pivoted with a long bearing, $k$, to prevent derangement or lateral movement. The guide-wheel frame swivels vertically upon the pivot-bar $i$, clamped by plates L, and consists of two plates, M M', which are fastened together by a bolt, $l$. These two plates M M' are provided with semicircular grooves, which clamp the two vertical rods N N, which latter connect the front-wheel axle with the handles, and are bent rearwardly to form the guiding arrangement for the velocipede.

The velocipede as thus described, it will be seen, is one presenting great simplicity and compactness of construction, and one in which the parts may be readily separated or put together without the use of other tools than a wrench, so that it can be easily packed for transportation, and any of its parts readily replaced.

Referring to the feature of the retracting-lever, I would state that I am aware that a pulley has been employed heretofore for the same purpose; but the necessary position of the pulley between the driving-pulleys and beneath the axle requires so much room as to render it necessary to employ larger wheels and locate the axle higher than is desirable for a girl's velocipede.

My horizontal transversely-arranged retracting-lever, it will be seen, permits me to accomplish the same result and in a better way, in that, as it oscillates in horizontal planes, it can be placed close to, and immediately beneath, the running-gear, occupying but little room, so that the velocipede can be made much lower, and thus better adapted to girls' use. Furthermore, the location of the pulley, in the case referred to, in a vertical plane at right angles to the driving-pulleys necessitates the employment of a separate round cord attached to the ends of the straps to prevent the twisting of the straps, while with my horizontal retracting-lever no such separate cord is required; but the straps are made continuous from the treadle around the driving-pulleys to the retracting-levers, which latter, by reason of their construction and arrangement, do not permit the twisting of the straps. The diameter of the pulley also must always be as great as the distance between the driving-pulleys to prevent the slipping off of the band from the driving-pulleys, which necessary large size of the retracting-pulley is objectionable. I therefore disclaim the pulley as employed for this purpose, and confine my invention to the horizontal transversely-arranged retracting-lever, as described.

Having thus described my invention, what I claim as new is—

1. The wheels provided with studs $a$, in combination with the detachable plate I, having recesses with inclined bottoms $d$, the rollers $b$, and the hollow loosely-revolving pulley E, carrying the straps and operated by the treadle, substantially as and for the purpose described.

2. The wheel having its hub extended at $c$, in combination with the hollow pulley pivoted upon said extension, the plate I, and rollers $b$, substantially as described.

3. The combination, with the axle and the reach, of the T-shaped plates J K, hollowed out, as described, and the bolt $f$ passing through and securing the same, substantially as described.

4. The T-shaped plate J, having stud $e$, in combination with the retracting-lever pivoted upon said stud, substantially as described.

5. The transversely-arranged retracting-lever, pivoted horizontally beneath the running-gear, and combined with the driving-pulleys, straps, and treadles of a velocipede, substantially as and for the purpose described.

6. The combination, with the upturned end of the reach and the guide-wheel frame, of the separable plates L L, provided with studs $j\ j$, and fastened by bolts $h\ h'$, the separable plates M M', fastened by bolt $l$, and the pivot-bar $i$, connecting the two sets of plates.

JAMES FISHWICK.

Witnesses:
CHARLES C. SPREEN,
F. HERMAN.